(12) United States Patent
Andersen et al.

(10) Patent No.: US 12,104,702 B2
(45) Date of Patent: Oct. 1, 2024

(54) GASKET, FLUID FLOW CONTROL VALVE AND METHOD OF CLEANING SUCH A VALVE

(71) Applicant: ALFA LAVAL CORPORATE AB, Lund (SE)

(72) Inventors: Jens Folkmar Andersen, Fredericia (DK); Otto Jensen, Aabreraa (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/639,721

(22) PCT Filed: Sep. 8, 2020

(86) PCT No.: PCT/EP2020/075086
§ 371 (c)(1),
(2) Date: Mar. 2, 2022

(87) PCT Pub. No.: WO2021/048130
PCT Pub. Date: Mar. 18, 2021

(65) Prior Publication Data
US 2022/0333693 A1    Oct. 20, 2022

(30) Foreign Application Priority Data

Sep. 10, 2019   (EP) .................................. 19196438

(51) Int. Cl.
*F16K 1/46* (2006.01)
*F16J 15/06* (2006.01)
(Continued)

(52) U.S. Cl.
CPC ............ *F16K 1/385* (2013.01); *F16J 15/064* (2013.01); *F16J 15/162* (2013.01); *F16K 1/46* (2013.01)

(58) Field of Classification Search
CPC ............ F16K 1/385; F16K 1/46; F16J 15/064
See application file for complete search history.

(56) References Cited

U.S. PATENT DOCUMENTS

| 865,798 A | 9/1907 | Peterson |
| 2,084,210 A | 6/1937 | Meacham et al. |
| (Continued) | | |

FOREIGN PATENT DOCUMENTS

| CN | 1133084 A | 10/1996 |
| CN | 102203487 A | 9/2011 |
| (Continued) | | |

OTHER PUBLICATIONS

Translation of DE 2524940; Stosiek Johannes Dipl Ing, Mattiske Wolfgang; Dec. 9, 1976.*
(Continued)

*Primary Examiner* — Paul J Gray
(74) *Attorney, Agent, or Firm* — BUCHANAN INGERSOLL & ROONEY PC

(57) ABSTRACT

A valve disc gasket for use in a fluid flow control valve includes a frustoconical, ring-shaped body part having a plurality of circumferentially distributed asymmetrical, through-going openings and/or slits and/or asymmetrical protrusions, wherein an internal surface of the respective asymmetrical through-going opening and/or slit forms a vane surface and/or wherein an external surface of the respective asymmetrical protrusion forms a vane surface, wherein the asymmetrical through-going openings and/or slits and/or protrusions are asymmetrical at least in the sense that respective through-going opening or slit and/or protrusion is asymmetric relative to any radial plane intersecting the respective through-going opening or slit and/or the respective protrusion. Also disclosed is a fluid flow control valve and a method for cleaning a fluid flow control valve.

23 Claims, 8 Drawing Sheets

(51) Int. Cl.
*F16J 15/16* (2006.01)
*F16K 1/38* (2006.01)

(56) References Cited

U.S. PATENT DOCUMENTS

| | | |
|---|---|---|
| 4,531,532 A | 7/1985 | Zimmerly |
| 5,358,212 A | 10/1994 | Soltys et al. |
| 5,904,173 A | 5/1999 | Ozawa |
| 5,996,966 A | 12/1999 | Zimmerly |
| 6,056,270 A | 5/2000 | Zimmerly |
| 7,530,368 B2 | 5/2009 | Deger |
| 2003/0026718 A1 | 2/2003 | Dziver et al. |
| 2005/0251988 A1 | 11/2005 | Mendiboure |
| 2006/0272715 A1 | 12/2006 | Larsen et al. |
| 2010/0051117 A1 | 3/2010 | Lin et al. |
| 2018/0345298 A1 | 12/2018 | Törnblom |

FOREIGN PATENT DOCUMENTS

| | | |
|---|---|---|
| CN | 207131868 U | 3/2018 |
| CN | 108061167 A | 5/2018 |
| CN | 108698052 A | 10/2018 |
| CN | 109654257 A | 4/2019 |
| DE | 2330168 A1 | 1/1975 |
| DE | 2524940 A1 | 12/1976 |
| GB | 726289 A | 3/1955 |
| GB | 1 464 728 A | 2/1977 |
| WO | 02101243 A2 | 12/2002 |

OTHER PUBLICATIONS

European Search Report for European Application No. 19196438.6 dated Feb. 21, 2020 (9 pages).

International Search Report (PCT/ISA/210) and Written Opinion (PCT/ISA/237) dated Sep. 30, 2020, by the European Patent Office as the International Searching Authority for International Application No. PCT/EP2020/075086.

Office Action (The First Office Action) dated Mar. 27, 2023, by the National Intellectual Property Administration, P. R. China in corresponding Chinese Patent Application No. 202080077175.6 and an English translation of the Office Action. (23 pages).

Notification of Grant Patent Right for Invention issued Sep. 1, 2023, by the National Intellectual Property Administration, P. R. China in corresponding Chinese Patent Application No. 202080077175.6 and an English translation of the Notification. (6 pages).

\* cited by examiner

Fig.4a  Fig.4b

GASKET, FLUID FLOW CONTROL VALVE AND METHOD OF CLEANING SUCH A VALVE

FIELD OF INVENTION

The invention relates to a valve disc gasket for use in a fluid flow control valve. The invention also relates to a fluid flow control valve comprising such a valve disc gasket. The invention also relates to a method of cleaning such a fluid flow control valve.

TECHNICAL BACKGROUND

When designing a fluid flow control valve and a valve disc gasket for use in such a fluid flow control valve, the designer typically takes a plurality of design criteria in consideration. These design criteria typically involve that the valve disc gasket should provide sufficient sealing efficiency and that the valve disc gasket should be easily replaced, preferably on site or on the field. For certain applications, such as within the food industry or the like, it is also typically required that it should be easy to efficiently clean the fluid flow control valve. It is typically required that the fluid flow control valve should be designed to be efficiently cleaned using a so-called cleaning in place system in which a cleaning fluid is flushed past the fluid flow control valve.

In U.S. Pat. No. 4,531,532 there is disclosed a sanitary valve assembly including a valve and a field replaceable gasket. The gasket is formed with a plurality of resilient fingers which conform to a frustoconical surface of the valve head. The apex end of the valve head frustoconical surface is provided with a laterally extending shoulder. To assemble the gasket to the valve head, the gasket is pushed onto the valve head so that the fingers deflect as they contact the shoulder. Upon passing over the shoulder, the fingers snap back to their undeflected position to engage the shoulder and retain the gasket on the valve when in the relaxed condition. The gasket fits loosely on the valve head when the valve assembly is in the open position, thereby permitting the assembly to be cleaned in place by flushing washing fluid through the clearances between the valve head and gasket.

In U.S. Pat. No. 5,996,966 there is also disclosed a sanitary valve assembly including a valve with a field replaceable gasket. The gasket is formed with an opening capable of deformation to a shape which deforms sufficiently to slide over a noncircular retaining surface of the valve head. The valve head retaining surface is provided between a pair of axially spaced laterally extending shoulders including a shoulder formed of shoulder segments separated by concave indentations. Upon passing over the shoulder, the opening in the gasket reassumes its undeflected configuration in which it engages the shoulders thus retaining the gasket on the valve stem. Also this gasket fits loosely on the valve head when the valve assembly is in the open position, thereby permitting the assembly to be cleaned in place by flushing washing fluid through the clearances between the valve head and gasket.

However, it has been found that it is still difficult to clean the fluid flow control valve.

In U.S. Pat. No. 6,056,270 there is disclosed a valve gasket including a main body portion formed of an elastomeric material having a high hardness durometer. The main body portion has recesses located on its opposite sides and at least one opening through the body connecting the recesses. The opposed recesses and the opening are filled with an elastomeric material having a hardness of a lesser durometer, softer than that of the main body portion. At least one of the filled recesses forms a sealing surface of the gasket. In a preferred embodiment both filled recesses form sealing surfaces, one to the seat and one to the stem. In one embodiment the gasket is generally ring-shaped in configuration and the opposed recesses are on opposite sides of the ring and each circumscribe the circumference of the ring. This addresses the design criteria of providing efficient sealing and being easy to replace are addressed.

Thus, there is still a room for improvements when it comes to meeting the design criteria concerning efficient cleaning of the fluid flow control valve and especially when it comes to efficient cleaning of the fluid flow control valve when using a cleaning in place system in which a cleaning fluid is flushed past the fluid flow control valve.

SUMMARY OF INVENTION

It is an object of the invention to provide an improved design addressing at least the design criteria concerning efficient cleaning of a gasket, more precisely a valve disc gasket, of a fluid control valve as well as a fluid flow control valve.

This object has been achieved by a new and inventive design of a gasket, more precisely a valve disc gasket, for use in a fluid flow control valve.

The gasket, i.e. the valve disc gasket, which is configured to be used in a fluid flow control valve, comprises a frustoconical, ring-shaped body part having a geometrical main extension along a circular circumferential direction around an axis extending along an axial direction, wherein a cross-sectional shape of the frustoconical, ring-shaped body part, as seen in a radial plane, has a geometrical main extension being inclined relative to the axial direction with a component along the axial direction and with a component along a radial direction, such that the frustoconical, ring-shaped body part extends along a geometrical frustoconical envelope surface tapering in the axial direction, wherein the frustoconical, ring-shaped body part has an outwardly facing front wall surface facing with a component along the axial direction and an inwardly facing rear wall surface, opposite the front wall surface, the rear wall surface being configured to face a valve disc of said fluid flow control valve,
wherein the valve disc gasket further comprises
a) a plurality of asymmetrical through-going openings and/or asymmetrical through-going slits extending from the front wall surface to the rear wall surface of the frustoconical, ring-shaped body part, the asymmetrical through-going openings and/or asymmetrical through-going slits being distributed along the circular circumferential direction, wherein an internal surface of the respective through-going opening and/or slit forms a vane surface, and/or
b) a plurality of asymmetrical protrusions having an extension from the front wall surface of the frustoconical, ring-shaped body part with a component along the axial direction, the asymmetrical protrusions being distributed along the circular circumferential direction, wherein an external surface of the respective protrusion forms a vane surface,
wherein the asymmetrical through-going openings and/or asymmetrical through-going slits and/or asymmetrical protrusions are asymmetrical at least in the sense that respective through-going opening and/or slit and/or protrusion is asymmetric relative to any radial plane intersecting the respective through-going opening and/or the respective slit and/or the respective protrusion.

In short, the valve disc gasket comprises basically a frustoconical, ring-shaped body part having a plurality of circumferentially distributed asymmetrical through-going openings and/or a plurality of circumferentially distributed asymmetrical through-going slits and/or a plurality of circumferentially distributed asymmetrical protrusions.

By providing a plurality of a plurality of asymmetrical through-going openings and/or slits and/or a plurality of asymmetrical protrusions, when the fluid flow control valve is in a cleaning mode, a flow of cleaning liquid will interact with the vane surfaces such that the valve disc gasket is subjected to a torque around the axis thereby causing the valve disc gasket to rotate several revolutions about the axis relative to a valve disc supporting the valve disc gasket. It may alternatively be said that the flow of cleaning liquid will be routed by the vane surfaces whereby the counteracting force on the valve disc gasket will cause the valve disc gasket to rotate several revolutions about the axis relative to the valve disc supporting the valve disc gasket. This will significantly improve the cleaning efficiency. The cleaning of the valve disc gasket and the valve, such as the valve disc of the valve, will improve significantly. The cleaning efficiency will be significantly improved especially when it comes to cleaning the small clearances between the valve disc gasket and the valve disc.

The fluid flow control valve typically comprises a valve seat extending around a flow channel, wherein the valve disc and the valve disc gasket are configured to be moved into abutment with the seat and thereby close the flow channel and to be moved a distance away from the seat and thereby open the flow channel.

The valve disc gasket preferably fit loosely on the valve disc when the valve disc and valve disc gasket have been moved a distance away from the seat allowing the valve disc gasket to rotate a plurality of revolutions on said valve disc of said fluid flow control valve and thereby permitting the fluid flow control valve to be cleaned in place by flushing cleaning fluid amongst others through clearances between the valve disc and the valve disc gasket.

Each vane surface may form an angle with any radial plane intersecting the respective asymmetrical through-going opening and/or slit and/or the respective protrusion as seen in a plane having the axial direction as normal direction. The angle is preferably at least 10 degrees relative to a central radial plane. A central radial plane is a plane bisecting a sector formed by all radial planes intersecting the respective through-going opening and/or the respective through-going slit and/or the respective protrusion. More preferably the angle is at least 20 degrees relative to the central radial plane. Even more preferably the angle is at least 25 degrees relative to the central radial plane. Preferably the angle is less than 55 degrees relative to the central radial plane. More preferably the angle is less than 45 degrees relative to the central radial plane. Even more preferably the angle is less than 40 degrees relative to the central radial plane. Thus, the angle may e.g. be between 10 and 55 degrees relative to the central radial plane. According to one preferred embodiment the angle is between 10 and 45 degrees relative to the central radial plane. According to one preferred embodiment the angle is between 10 and 40 degrees relative to the central radial plane. According to another preferred embodiment the angle is between 20 and 55 degrees relative to the central radial plane. According to another preferred embodiment the angle is between 20 and 45 degrees relative to the central radial plane. According to one preferred embodiment the angle is between 20 and 40 degrees relative to the central radial plane. According to another preferred embodiment the angle is between 25 and 55 degrees relative to the central radial plane. According to another preferred embodiment the angle is between 25 and 45 degrees relative to the central radial plane. According to one preferred embodiment the angle is between 25 and 40 degrees relative to the central radial plane. According to another preferred embodiment the angle is between 35 and 40 degrees relative to the central radial plane. These minimum angles are chosen such that the flow of cleaning fluid will provide a significant force in the tangential circumferential direction and thereby provide a significant torque about the axis. The maximum angles are chosen such that there is not provided a too strong force in the radial direction. Such a radial force would provide a flow resistance, but would not contribute to the desired action of rotating the valve disc gasket relative to the valve disc.

Each vane surface may have a major surface extension having a normal with a component along the circular circumferential direction.

Each vane surface may have a major surface extension defined by a vector having at least a component, preferably a major component, along the axial direction and by a vector extending in a direction extending transversely to the axial direction and being inclined in a first direction relative to any radial plane intersecting the respective asymmetrical through-going opening and/or slit and/or the respective asymmetrical protrusion.

The valve disc gasket may comprise a plurality of slits distributed along the circular circumferential direction, the slits extending from an inner circular surface of the frustoconical, ring-shaped body part, at least with a component along a respective radial plane, and through the frustoconical, ring-shaped body part from the front wall surface to the rear wall surface. It may in this context be noted that the slits may be slits provided solely for the purpose of facilitating installation of the valve disc gasket onto the valve disc and/or for facilitating removal of the valve disc gasket from the valve disc. The slits may also be provided with the purpose of being asymmetric slits providing vane surfaces. Such asymmetric slits will typically also by virtue of being a slit extending from the inner circular surface also facilitate installation of the valve disc gasket onto the valve disc and/or for facilitate removal of the valve disc gasket from the valve disc. However, it is conceivable that there are provided different kinds of slits being designed somewhat differently such that some of the slits are provided with the purpose of facilitating installation of the valve disc gasket onto the valve disc and/or for facilitating removal of the valve disc gasket from the valve disc and some of the slits are provided with the purpose of providing vane surfaces.

A least a sub-set of the plurality of slits may be asymmetrical slits having an internal surface being provided with at least one of said vane surfaces. It may in this context be noted that it is also conceivable that all the are asymmetrical slits having an internal surface being provided with at least one of said vane surfaces. In a preferred embodiment all the are asymmetrical slits are provided with an internal surface forming a respective one of said vane surfaces.

The valve disc gasket may comprise a plurality of asymmetrical protrusions distributed along the circular circumferential direction, wherein each protrusion extends from the front wall surface of the frustoconical, ring-shaped body part with a component along the axial direction and has an external surface forming at least one of said vane surfaces. By providing protrusions it is possible to form vane surfaces having an extension along the axial direction being greater than the material thickness as measured along the axial direction between the front wall surfaces to the rear wall surface, which material thickness along the axial direction sets a maximum extension in case the vane surfaces are formed on internal surfaces of asymmetrical through-going openings and/or slits.

According to one aspect of the invention, the valve disc gasket comprises a plurality of asymmetrical slits having vane surfaces and a plurality of asymmetrical protrusions having vane surfaces. Thus, according to this aspect, the valve disc gasket comprises a plurality of slits distributed along the circular circumferential direction, the slits extending from an inner circular surface of the frustoconical, ring-shaped body part, at least with a component along a respective radial plane, and through the frustoconical, ring-shaped body part from the front wall surface to the rear wall surface, wherein at least a sub-set of the plurality of slits are asymmetrical slits having an internal surface being provided with at least one of said vane surfaces, and wherein the valve disc gasket comprises a plurality of asymmetric protrusions distributed along the circular circumferential direction, wherein each protrusion extends from the front wall surface of the frustoconical, ring-shaped body part with a component along the axial direction and has an external surface forming at least one of said vane surfaces.

The valve disc gasket may comprise a plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces.

According to one aspect of the invention, the valve disc gasket comprises a plurality of asymmetric slits having vane surfaces and a plurality of asymmetrical through-going openings having vane surfaces. Thus, according to this aspect the valve disc gasket comprises a plurality of slits distributed along the circular circumferential direction, the slits extending from an inner circular surface of the frustoconical, ring-shaped body part, at least with a component along a respective radial plane, and through the frustoconical, ring-shaped body part from the front wall surface to the rear wall surface, wherein at least a sub-set of the plurality of slits are asymmetrical slits having an internal surface being provided with at least one of said vane surfaces, and wherein the valve disc gasket comprises a plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces. This combination may e.g. be useful if the provision of the desired number of slits to provide the desired torque would weaken the body part too much along the inner circular surface. It may be noted that it may in accordance with one embodiment be combined with asymmetrical protrusions providing additional vane surfaces. In accordance with another embodiment the valve disc gasket may be formed without any such asymmetrical protrusions and in such a case preferably be designed without any protrusions extending from the front surface at all.

According to one aspect of the invention, the valve disc gasket comprises a plurality of asymmetrical protrusions having vane surfaces and a plurality of asymmetrical through-going openings having vane surfaces. Thus, according to this aspect, the valve disc gasket comprises a plurality of asymmetrical protrusions distributed along the circular circumferential direction, wherein each protrusion extends from the front wall surface of the frustoconical, ring-shaped body part with a component along the axial direction and has an external surface forming at least one of said vane surfaces, and wherein the valve disc gasket comprises a plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces.

This combination may e.g. be useful if the provision of slits to provide the desired torque would weaken the body part too much along the inner circular surface. Thus, in one embodiment of this aspect, there are not slits provided in the circular inner surface.

However, it may be noted that this combination may be combined with slits. It may in this context be noted that the slits may be slits provided solely for the purpose of facilitating installation of the valve disc gasket onto the valve disc and/or for facilitating removal of the valve disc gasket from the valve disc. The slits may also be provided with the purpose of being asymmetric slits providing vane surfaces. Such asymmetric slits will typically also by virtue of being a slit extending from the inner circular surface also facilitate installation of the valve disc gasket onto the valve disc and/or for facilitate removal of the valve disc gasket from the valve disc. However, it is conceivable that there are provided different kinds of slits being designed somewhat differently such that some of the slits are provided with the purpose of facilitating installation of the valve disc gasket onto the valve disc and/or for facilitating removal of the valve disc gasket from the valve disc and some of the slits are provided with the purpose of providing vane surfaces.

According to one aspect of the invention, the valve disc gasket comprises a plurality of asymmetrical through-going openings having vane surfaces, a plurality of asymmetrical through-going slits having vane surfaces, and a plurality of asymmetrical protrusions having vane surfaces. Thus, according to this aspect, the valve disc gasket comprises a plurality of slits distributed along the circular circumferential direction, the slits extending from an inner circular surface of the frustoconical, ring-shaped body part, at least with a component along a respective radial plane, and through the frustoconical, ring-shaped body part from the front wall surface to the rear wall surface, wherein at least a sub-set of the plurality of slits are asymmetrical slits having an internal surface being provided with at least one of said vane surfaces, wherein the valve disc gasket comprises a plurality of asymmetrical protrusions distributed along the circular circumferential direction, wherein each protrusion extends from the front wall surface of the frustoconical, ring-shaped body part with a component along the axial direction and has an external surface forming at least one of said vane surfaces, and wherein the valve disc gasket comprises a plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces.

The rear wall surface is preferably shaped as a raceway. An effect of the raceway shape is that the valve disc gasket is allowed to rotate a plurality of revolutions on said valve disc of said fluid flow control valve. The raceway shape provides a cambered (or canted) profile of the rear wall surface. The rear wall surface is preferably shaped as a raceway allowing the valve disc gasket to rotate a plurality of revolutions on said valve disc of said fluid flow control valve.

The vane surfaces taken together preferably has a total surface area being x times y $mm^2$, where x is at least three, preferably at least four, and y is a largest outer diameter in millimetre of a sealing portion of the valve disc gasket.

Each vane surface preferably has an extension of at least 2 mm along the axial direction, more preferably an extension of at least 4 mm along the axial direction.

The above-mentioned object has also been achieved by a new and inventive design fluid flow control valve. The fluid flow control valve comprises
a valve disc,
a gasket, i.e. a valve disc gasket, of the disclosed inventive kind attached to the valve disc, and
a valve seat extending around a flow channel,
wherein the valve disc and the valve disc gasket are configured to be moved into abutment with the seat and thereby close the flow channel and to be moved a distance away from the seat and thereby open the flow channel, and
wherein the valve disc gasket fits loosely on the valve disc when the valve disc and valve disc gasket have been moved a distance away from the seat allowing the valve disc gasket to rotate a plurality of revolutions on said valve disc of said fluid flow control valve and thereby permitting the fluid flow control valve to be cleaned in place by flushing cleaning fluid amongst others through clearances between the valve disc and the valve disc gasket.

The above-mentioned object has also been achieved by a new and inventive method of cleaning a fluid flow control valve.

The method comprises
introducing a cleaning liquid in a flow channel such that a flow of cleaning liquid may be maintained during a cleaning period,
moving the valve disc and the valve disc gasket attached thereto in close proximity to the seat, whereby a flow of cleaning liquid will interact with the vane surfaces such that the valve disc gasket is subjected to a torque around the axis thereby causing the valve disc gasket to rotate several revolutions about the axis relative to the valve disc.

The invention may also in short be said to relate to a valve disc gasket for use in a fluid flow control valve, the valve disc gasket comprising a frustoconical, ring-shaped body part having a plurality of circumferentially distributed asymmetrical, through-going openings and/or asymmetrical through-going slits and/or asymmetrical protrusions, wherein an internal surface of the respective asymmetrical through-going opening and/or slit forms a vane surface and/or wherein an external surface of the respective asymmetrical protrusion forms a vane surface, wherein the asymmetrical through-going openings and/or slits and/or asymmetrical protrusions are asymmetrical at least in the sense that respective asymmetrical through-going opening and/or slit and/or asymmetrical protrusion is asymmetric relative to any radial plane intersecting the respective through-going opening or slit and/or the respective protrusion.

BRIEF DESCRIPTION OF THE DRAWINGS

The invention will by way of example be described in more detail with reference to the appended schematic drawings, which shows a presently preferred embodiment of the invention.

FIGS. 4a-d discloses a valve disc gasket in accordance with a second embodiment.

DETAILED DESCRIPTION OF PREFERRED EMBODIMENTS

Figure 1:
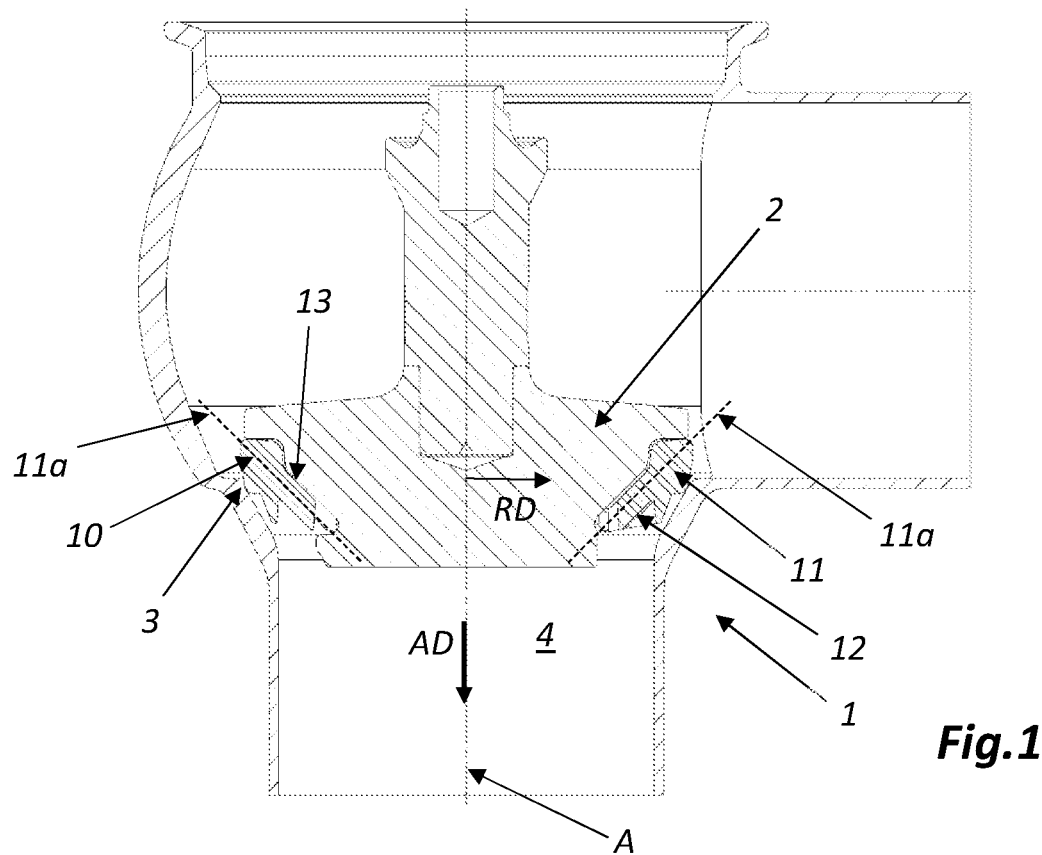
FIG. 1 is a cross-sectional view of a fluid flow control valve having a valve disc and a valve seat, the valve disc supporting a valve disc gasket.
Figure 2:
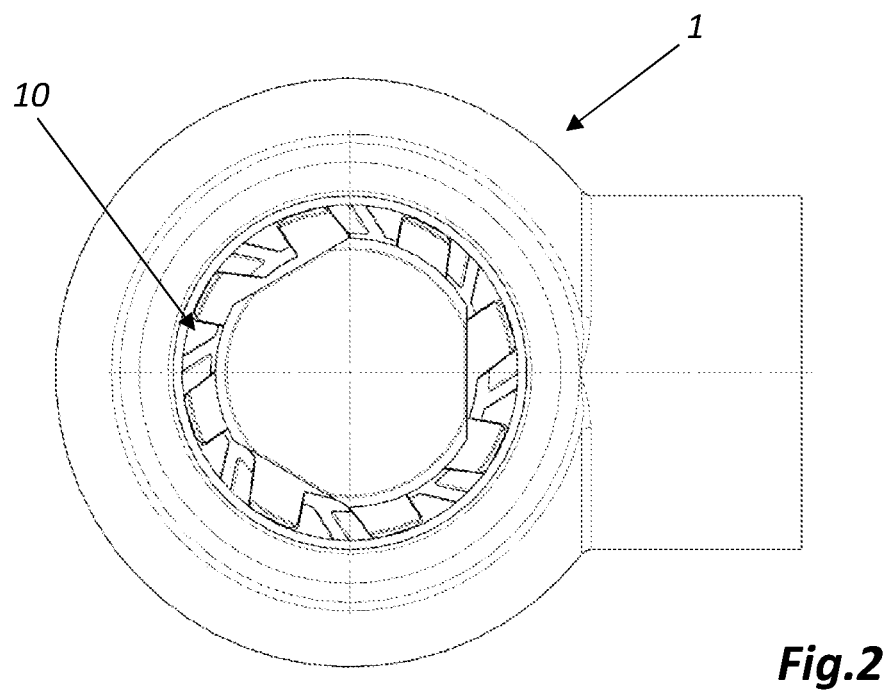
FIG. 2 is a view of the fluid flow control valve of FIG. 1 as seen from below in FIG. 1.

In FIG. 1, there is in a cross-sectional view disclosed a fluid flow control valve 1 having a valve disc 2 and a valve seat 3. The valve seat 3 extends around a flow channel 4. The valve disc gasket 10 is attached to the valve disc 2. Alternatively, it may be said that the valve disc gasket 10 is supported by the valve disc 2. The valve disc 2 and the valve disc gasket 10 are configured to be moved into abutment with the seat 3, by moving the valve disc 2 downwardly in FIG. 1, and thereby close the flow channel 4. The valve disc 2 and the valve disc gasket 10 are also configured to be moved a distance away from the seat 3, by moving the valve disc 2 upwardly in FIG. 1, and thereby open the flow channel 4.

By a valve disc gasket is meant a gasket that is attached to or supported by a valve disc as described above. The valve disc gasket is the gasket that closes the flow channel by abutment with the valve seat and the valve disc to obtain a closed state of the valve. The valve disc gasket also opens up the flow channel when placing the valve disc gasket and the valve disc at a distance from the valve seat to obtain an open state of the valve. The valve disc can alternatively be denoted for example valve plug, valve cone or sometimes valve body, in which cases the valve disc gasket can be denoted valve plug gasket, valve cone gasket or valve body gasket. The valve disc need not be disc shaped but can have any suitable shape closing (and opening up) the flow channel as long as the valve disc gasket fits thereon.

The valve disc gasket 10 fits loosely on the valve disc 2 when the valve disc 2 and valve disc gasket 10 has been moved a distance away from the seat 3 allowing the valve disc gasket 10 to rotate a plurality of revolutions on said valve disc 2 of said fluid flow control valve 1 and thereby permitting the fluid flow control valve 1 to be cleaned in place by flushing cleaning fluid amongst others through clearances between the valve disc 2 and the valve disc gasket 10. As will be disclosed in more detail below, the valve disc gasket 10 is provided with a plurality of vane surfaces 25 such that it may be cleaned in accordance with a method comprising; introducing a cleaning liquid in a flow channel

4 such that a flow of cleaning liquid may be maintained during a cleaning period, and moving the valve disc 2 and the valve disc gasket 10 attached thereto in close proximity to the seat 3, whereby a flow of cleaning liquid will interact with the vane surfaces 25 such that the valve disc gasket 10 is subjected to a torque around the axis A thereby causing the valve disc gasket 10 to rotate several revolutions about the axis A relative to the valve disc 2.

As disclosed in the figures, the valve disc gasket 10 comprises basically a frustoconical, ring-shaped body part 11 having a plurality of circumferentially distributed asymmetrical, through-going openings 21 and/or a plurality of circumferentially distributed asymmetrical through-going slits 22 and/or a plurality of circumferentially distributed asymmetrical protrusions 23. In more detail, it may be said that an internal surface 21a, 22a of the respective asymmetrical through-going opening 21 and/or asymmetrical through-going slit 22 forms a vane surface 25 and/or wherein an external surface 23a of the respective asymmetrical protrusion 23 forms a vane surface 25, wherein the through-going openings 21 and/or slits 22 and/or protrusions 23 are asymmetrical at least in the sense that respective through-going opening 21 or slit 22 and/or protrusion 23 is asymmetric relative to any radial plane RP intersecting the respective through-going opening 21 or slit 22 and/or the respective protrusion 23.

In FIGS. 3a-d, there is disclosed a design of a valve disc gasket 10 comprising a plurality of asymmetrical slits 22 having vane surfaces 25 and a plurality of asymmetrical protrusions 23 having vane surfaces 25.

In FIGS. 4a-d, there is disclosed a design of a valve disc gasket 10 comprising a plurality of asymmetrical slits 22 having vane surfaces 25 of the same kind as in FIGS. 3a-d, but without the asymmetrical protrusions 23.

Figure 3A:
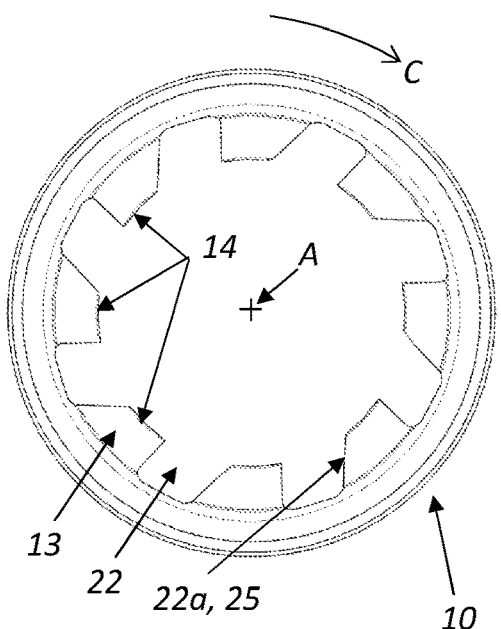
FIGS. 3a-d discloses a valve disc gasket in accordance with a first embodiment.
Figure 3B:
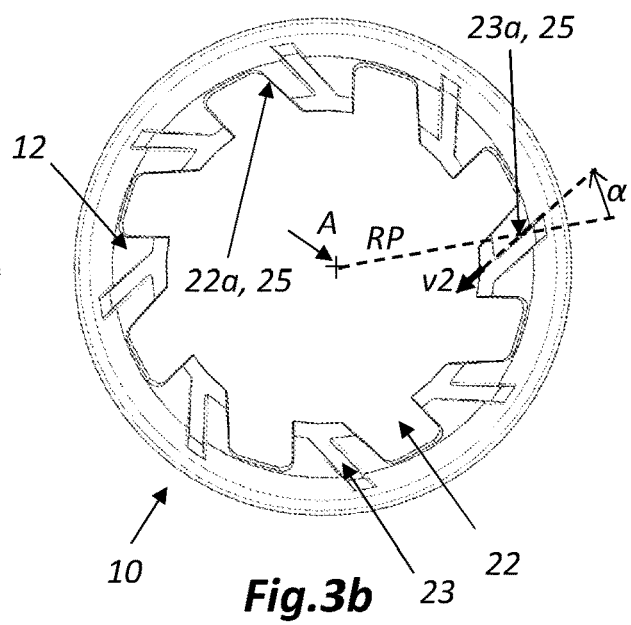
Figure 3C:
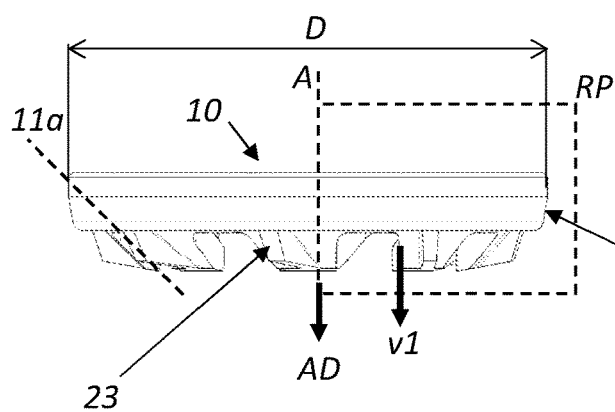
Figure 3D:
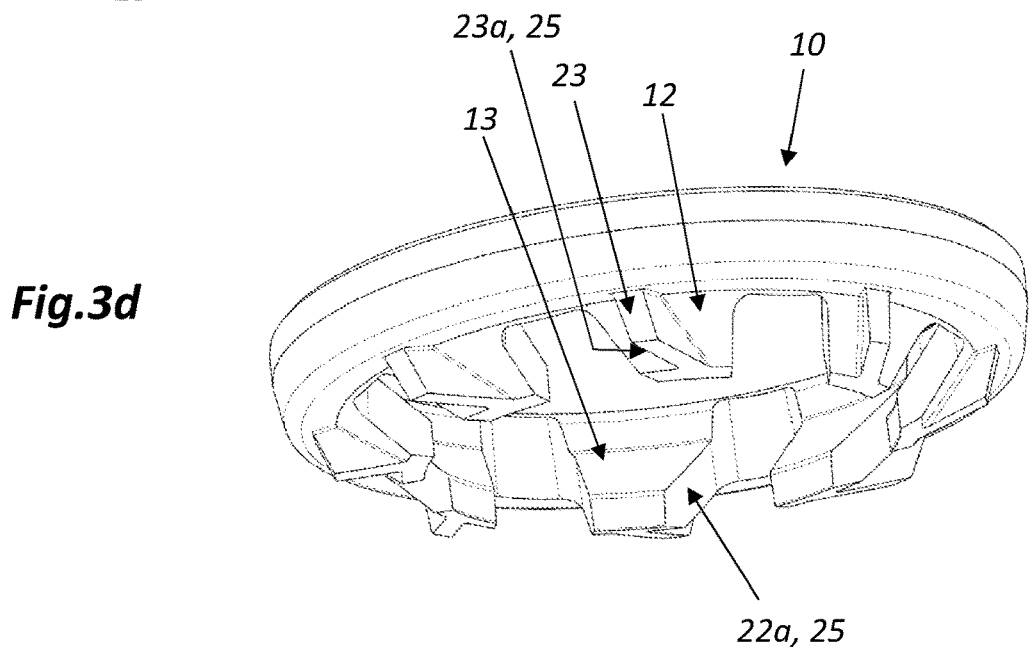
Figure 4C:
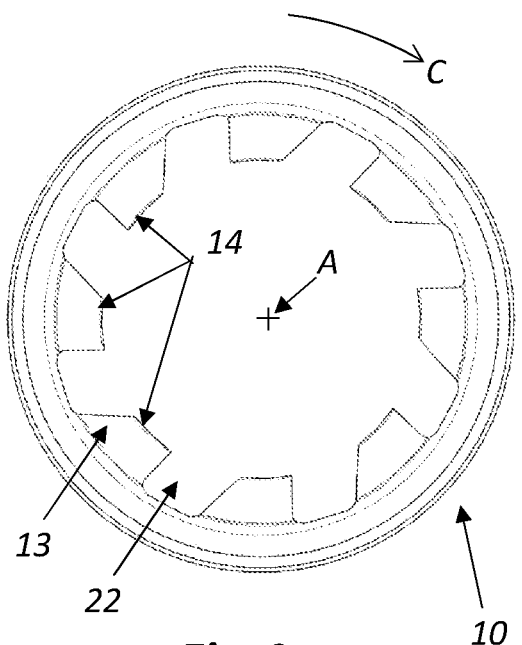
Figure 4C:
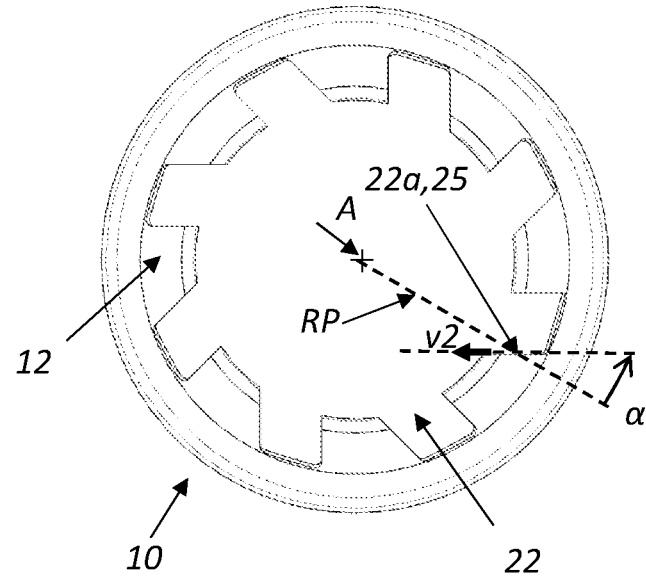
Figure 4C:
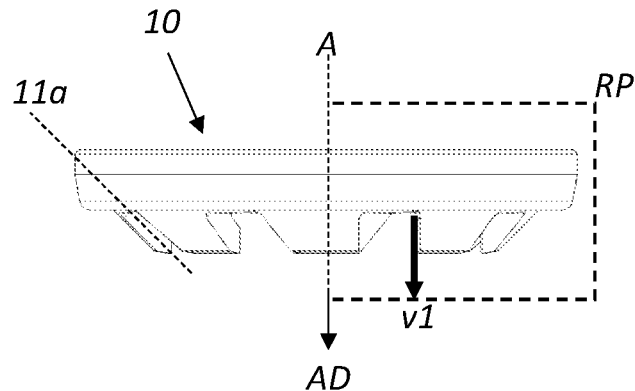
Figure 4D:
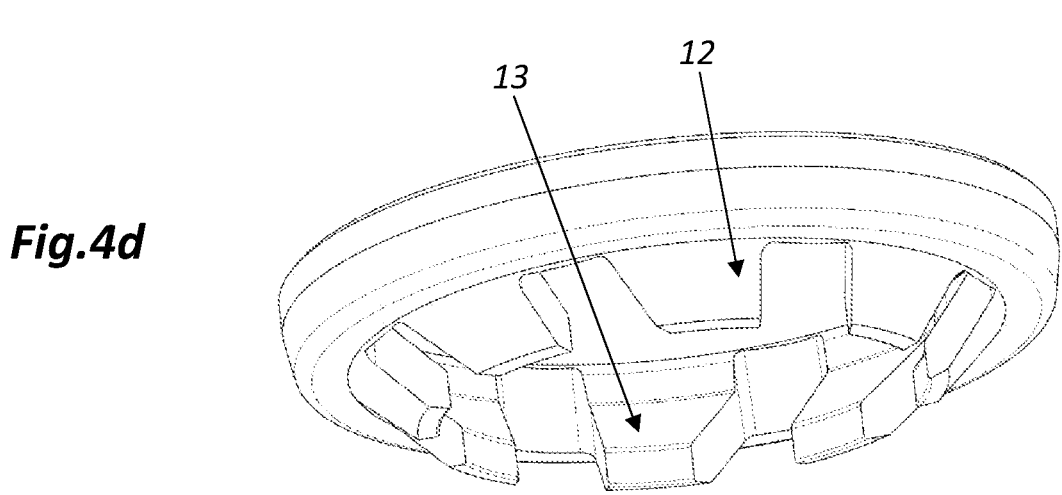

As shown in FIG. 4b, the valve disc gaskets 10 of FIGS. 3a-d and 4a-d both comprises a plurality of asymmetrical slits 22 distributed along the circular circumferential direction C. The slits 22 extend from an inner circular surface 14 of the frustoconical, ring-shaped body part 11, at least with a component along a respective radial plane RP, and through the frustoconical, ring-shaped body part 11 from the front wall surface 12 to the rear wall surface 13. The slits 22 are asymmetrical slits 22 and have an internal surface 22a being provided with or formed as a vane surface 25.

The valve disc gasket 10 of FIGS. 3a-d also comprises a plurality of asymmetric protrusions 23 distributed along the circular circumferential direction C. Each protrusion 23 extends from the front wall surface 12 of the frustoconical, ring-shaped body part 11 with a component v1 along the axial direction AD and has an external surface 23a forming at least one of said vane surfaces 25.

The asymmetrical through-going slits 22 and asymmetrical protrusions 23 are asymmetrical at least in the sense that respective through-going slit 22 and protrusion 23 is asymmetric relative to any radial plane RP intersecting the respective asymmetrical through-going slit 22 or the respective asymmetrical protrusion 23. In the figures, a central radial plane RP is consistently depicted. However, the phrase—any radial plane RP intersecting the respective asymmetrical through-going slit 22 and/or the respective asymmetrical protrusion 23—refers to a number of radial planes having slightly different angles and all extending from the axis A and intersecting the respective slit 22 or protrusion 23. The same applies to the asymmetrical through-going openings 21 introduced with reference to FIGS. 6a-e.

Figure 5A:
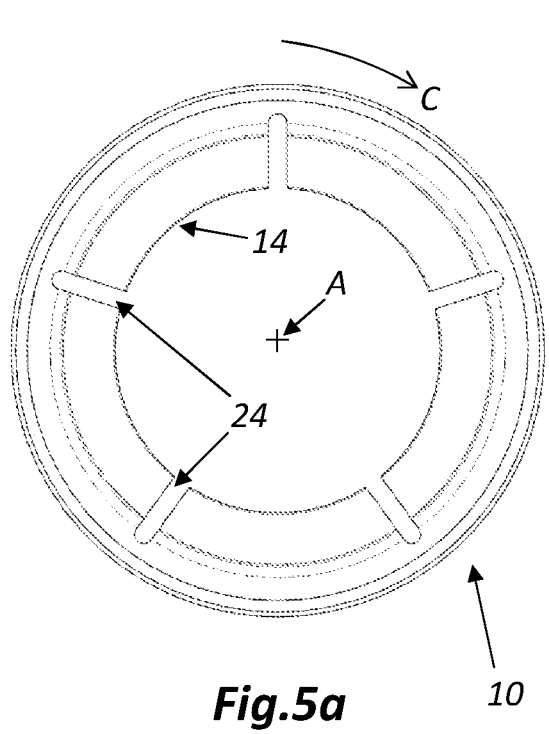
FIGS. 5a-c discloses a valve disc gasket in accordance with a third embodiment.
Figure 5B:
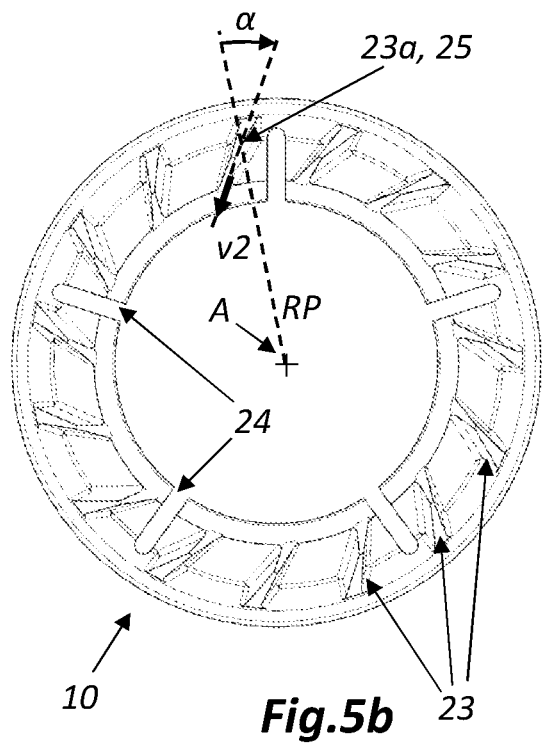

As shown e.g. in FIGS. 3b and 5b in respect of the asymmetrical protrusions 23, and as shown e.g. in FIG. 4b in respect of the asymmetrical slits 22, each vane surface 25 forms an angle α with the radial plane RP intersecting the respective through-going opening 21 or slit 22 and/or the respective protrusion 23 as seen in a plane having the axial direction AD as normal direction. The angle α is preferably at least 10 degrees relative to the central radial plane RP. More preferably the angle α is at least 20 degrees. Even more preferably the angle α is at least 25 degrees. Preferably the angle α is less than 55 degrees. More preferably the angle α is less than 45 degrees. Thus, the angle α may e.g. be between 10 and 55 degrees. According to one preferred embodiment the angle α is between 20 and 55 degrees. According to another preferred embodiment the angle α is between 25 and 55 degrees. According to another preferred embodiment the angle α is between 10 and 45 degrees. According to another preferred embodiment the angle α is between 20 and 45 degrees. According to another preferred embodiment the angle α is between 25 and 45 degrees. According to another preferred embodiment the angle α is between 10 and 40 degrees. According to another preferred embodiment the angle α is between 20 and 40 degrees. According to another preferred embodiment the angle α is between 25 and 40 degrees. According to another preferred embodiment the angle α is between 35 and 40 degrees. These preferred angles are applicable also to the other embodiments directly and indirectly disclosed throughout the description and the figures.

Figure 5C:
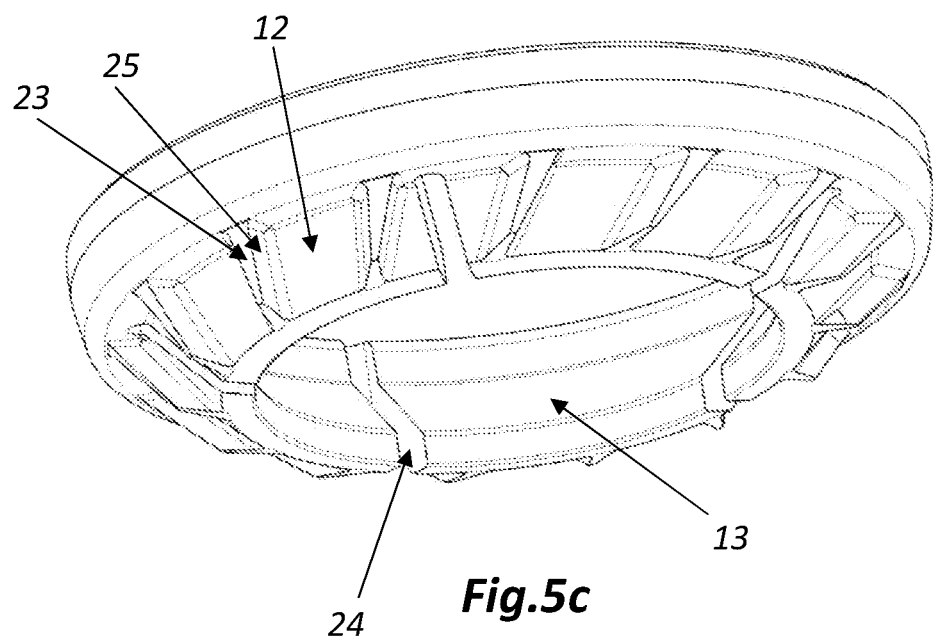

In FIGS. 5a-c, there is disclosed a design comprising a plurality of slits 24 distributed along the circular circumferential direction C. The slits 24 extend from an inner circular surface 14 of the frustoconical, ring-shaped body part 11, at least with a component along a respective radial plane RP, and through the frustoconical, ring-shaped body part 11 from the front wall surface 12 to the rear wall surface 13. It may in this context be noted that these slits 24 are not asymmetrical slits 22 providing vane surfaces 25 but are provided for the purpose of facilitating installation of the valve disc gasket 10 onto the valve disc 2 and/or for facilitating removal of the valve disc gasket 10 from the valve disc 2. The design in FIGS. 5a-c also comprises a plurality of asymmetrical protrusions 23 similar to the ones disclosed with reference to FIGS. 3a-d. However, it may be noted that the asymmetrical protrusions 23 in FIGS. 3a-d will result in that the valve disc gasket 10 will as seen in FIG. 3b rotate in clockwise direction whereas the asymmetrical protrusions in FIGS. 5a-c will result in that the valve disc gasket 10 will as seen in FIG. 5b rotate in counter-clockwise direction.

In FIGS. 6a-e, there is disclosed a design in which the valve disc gasket 10 comprises a plurality of asymmetrical through-going openings 21 distributed along the circular circumferential direction C. Each through-going opening 21 extends from the front wall surface 12 to the rear wall surface 13 of the frustoconical, ring-shaped body part 11 and has an internal surface 21a forming at least one of said vane surfaces 25. In this design there is not provided any slits 22, 24 or any protrusions 23. However, it is conceivable that this design may be provided with slits 24 facilitating installation and removal and/or be provided with asymmetrical slits 22. The slits 22, 24 may e.g. be alternatingly arranged between the openings 21. Such slits 22, 24 may be arranged between every opening 21 or e.g. interlaced after two or more, such as after two, three, or four consecutive openings 21.

Figure 6A:
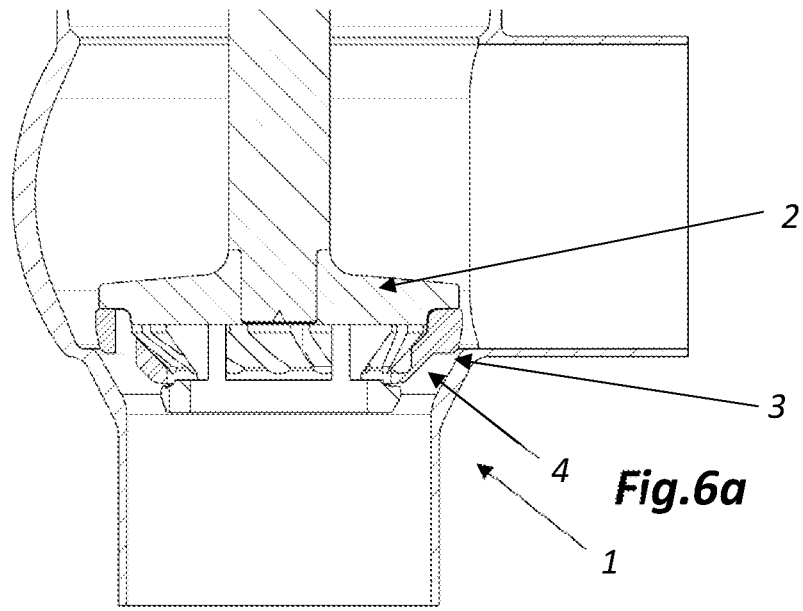
FIGS. 6a-e discloses a valve disc gasket in accordance with a fourth embodiment, as such, and as installed on a fluid flow control valve having a hollow valve disc.
Figure 6B:
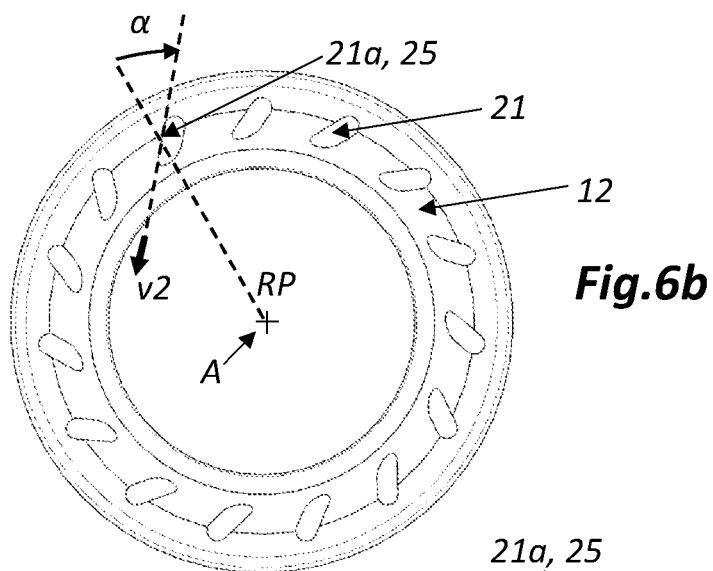
Figure 6C:
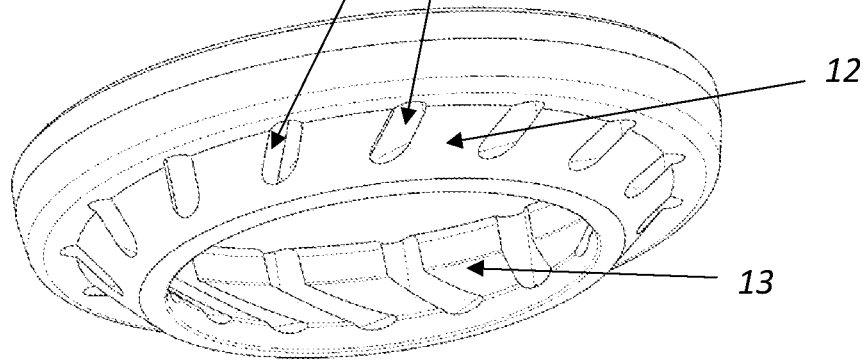
Figure 6D:
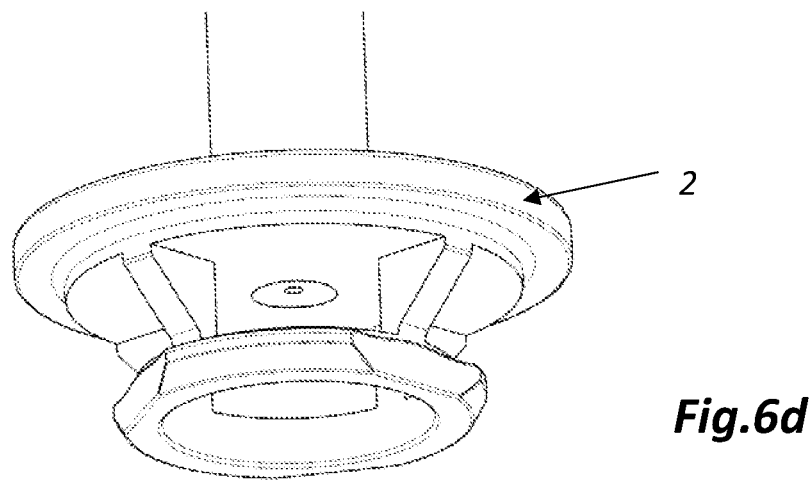
Figure 6E:
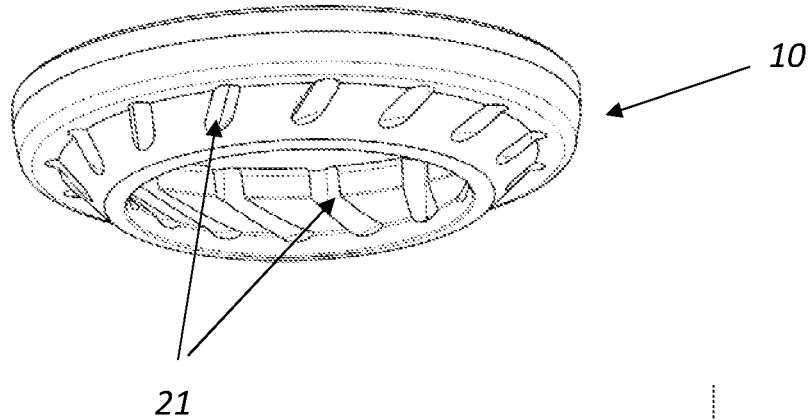
Figure 6E:
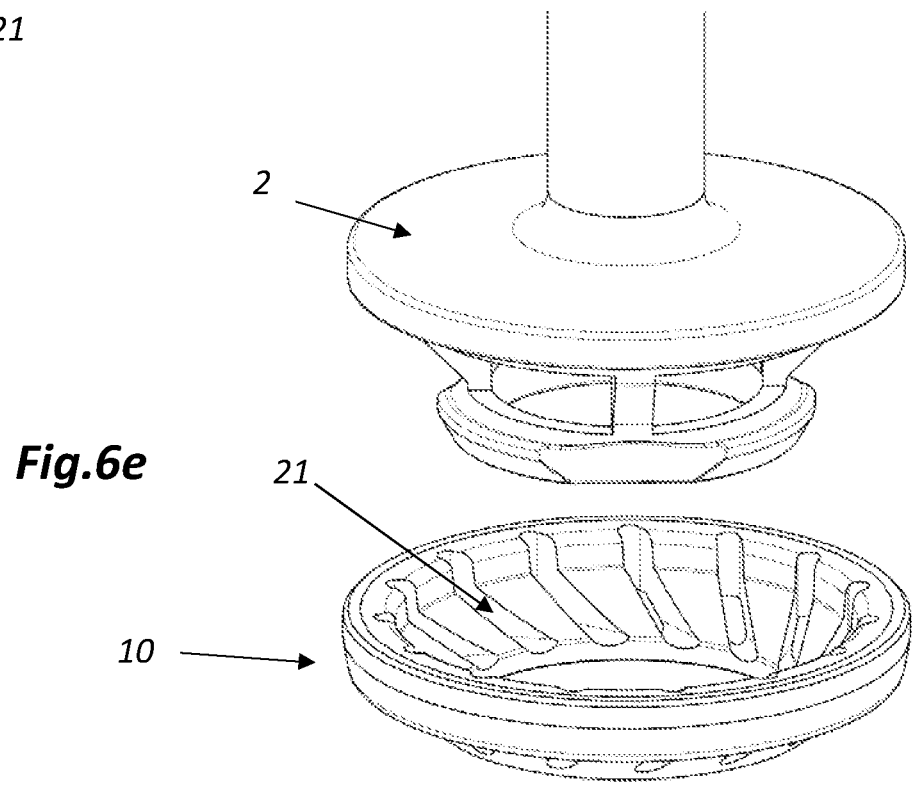
Figure 7A:
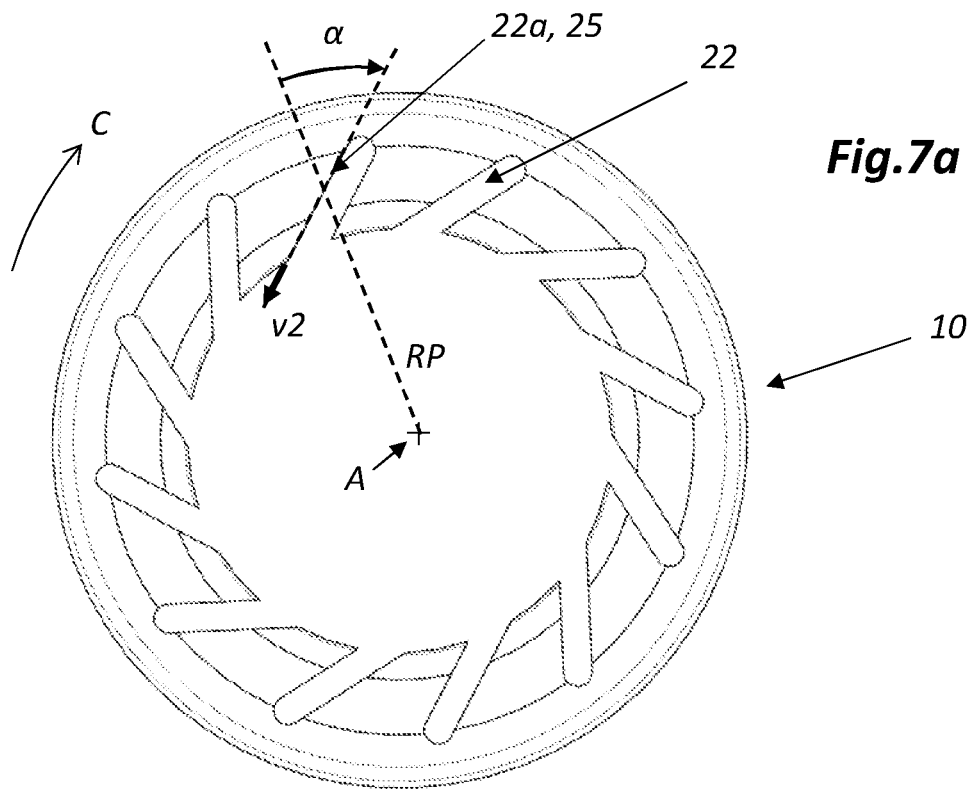
FIGS. 7a-d discloses a valve disc gasket in accordance with a fifth embodiment, as such, and as installed on a fluid flow control valve having a hollow valve disc as in FIGS. 6a-e.
Figure 7B:
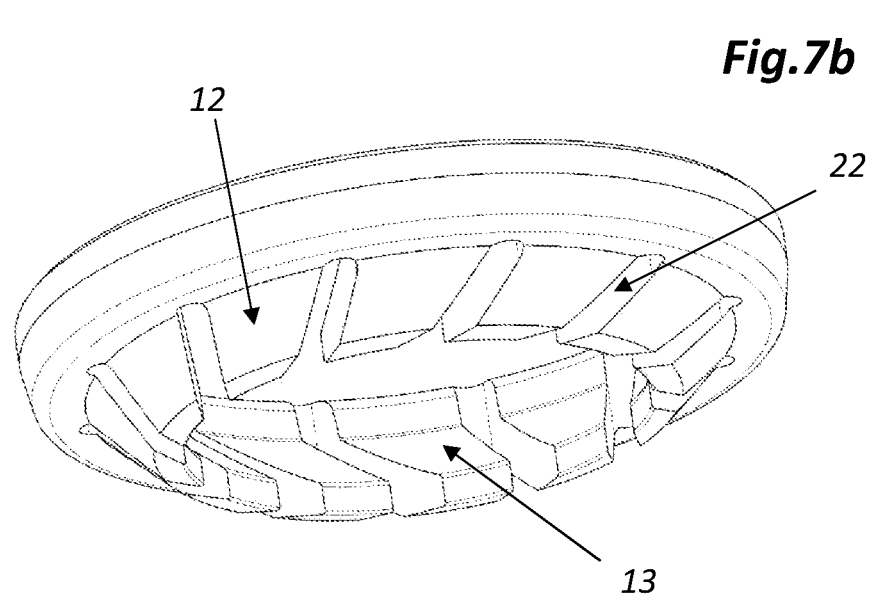
Figure 7C:
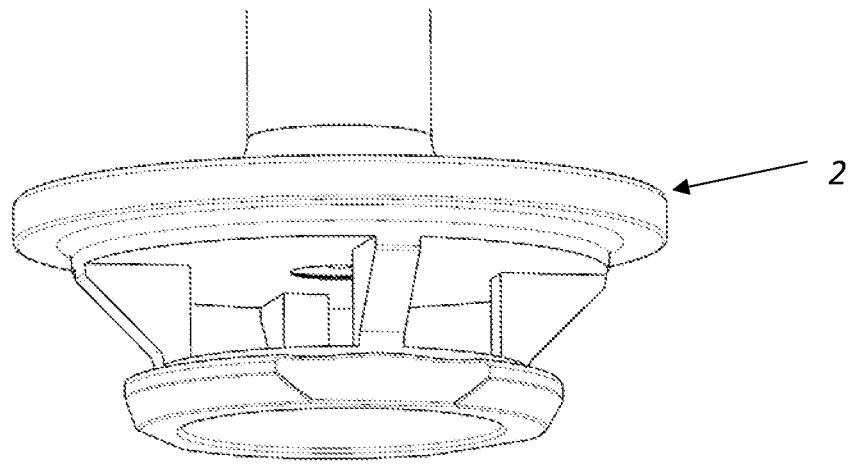
Figure 7D:
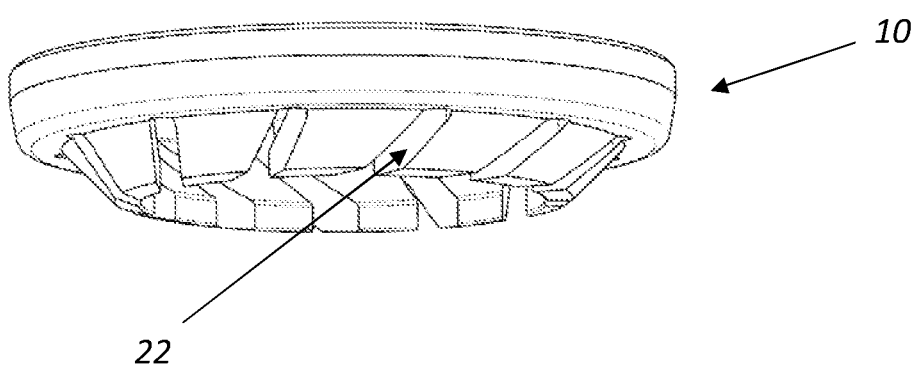
Figure 7D:
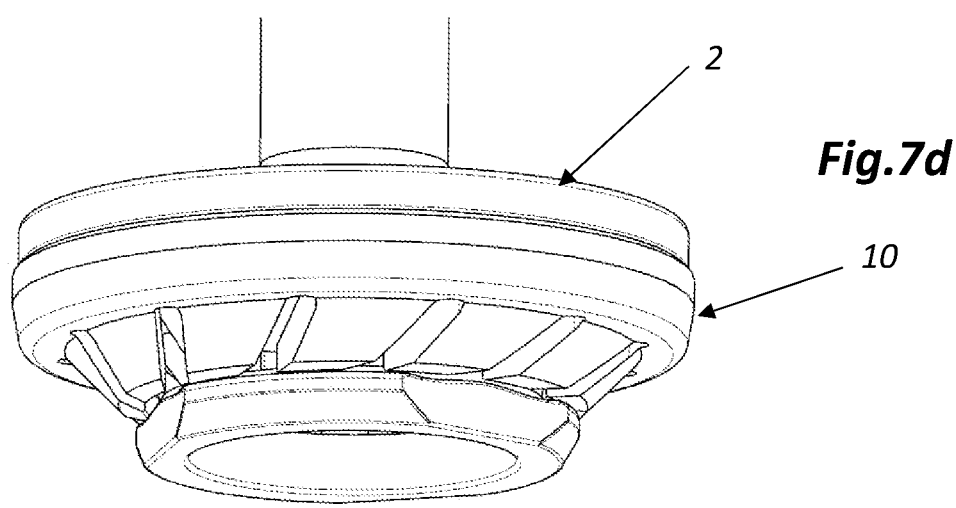

In FIGS. 6a and 6d-e it is shown a valve disc 2 being hollow. Such a design facilitates cleaning since it is easier to direct a flow of cleaning fluid into the clearances between the valve disc 2 and the valve disc gasket 10.

It may in this context be noted that the different valve disc gaskets 10, directly or indirectly disclosed in the figures and in the description, may be combined with a valve disc 2 as disclosed in FIG. 1 or with a hollow valve disc 2 as disclosed in FIGS. 6a, 6d-e. It is also conceivable that the valve disc 2 may be designed differently from what is disclosed in FIGS. 1 and 6a, 6d-e. However, a common design criterium is that it should preferably be designed such that the valve disc gasket 10 may rotate about the valve disc 2 such that the provision of asymmetrical openings 21 and/or slits 22 and/or protrusions 23 may result in a rotation of the valve disc gasket 10 relative to the valve disc 2.

In FIGS. 7a-d, there is disclosed a design similar to the design of FIGS. 6a-e. However, in the valve disc gasket 10 shown in FIGS. 7a-d, the openings 21 of FIGS. 6a-e has been designed as slits 22 extending from the inner circular surface 14 similarly as the slits 22 disclosed in FIGS. 3a-d and 4a-d. Thus, although the slits 22 of FIGS. 7a-d are narrower, they are also asymmetrical and provided with vane surfaces 25 in the same basic manner as the slits 22 of FIGS. 3a-d and 4a-d.

Irrespective of if the vane surface 25 are provided on asymmetrical openings 21 or asymmetrical slits 22 or asymmetrical protrusions 23, each vane surface 25 has a major surface extension having a normal with a component along the circular circumferential direction C. This may in more detail by said as that each vane surface 25 has a major surface extension defined by a vector v1 having at least a component, preferably a major component, along the axial direction AD and by a vector v2 extending in a direction extending transversely to the axial direction and being inclined in a first direction relative to any radial plane RP intersecting the respective asymmetrical through-going opening 12 and/or slit 22 and/or the respective protrusion 23.

As e.g. shown in FIGS. 3d, 4d, 5c, 6c, and 7b, the rear wall surface 13 is shaped as a raceway allowing the valve disc gasket 10 to rotate a plurality of revolutions on said valve disc 2 of said fluid flow control valve 1.

The vane surfaces 25, which may be provided on asymmetrical openings 21 and/or asymmetrical slits 22 and/or asymmetrical protrusions 23, when taken together has a total surface area being x times y $mm^2$, where x is at least three, preferably at least four, and y is a largest outer diameter D in millimetre of a sealing portion 12a of the valve disc gasket 10. The largest outer diameter D may e.g. be in the order of about 30-150 mm. For a 1-inch valve, the largest outer diameter D may typically be about 44 mm. For a 1.5-inch valve, the largest outer diameter D may typically be about 54 mm. For a 2-inch valve, the largest outer diameter D may typically be about 57 mm. For a 2.5-inch valve, the largest outer diameter D may typically be about 73 mm. For a 3-inch valve, the largest outer diameter D may typically be about 88 mm. For a 4-inch valve, the largest outer diameter D may typically be about 107 mm.

Each vane surface 25 preferably has an extension of at least 2 mm along the axial direction AD, more preferably an extension of at least 4 mm along the axial direction AD. The vane surfaces 25 preferably has an extension of at most 15 mm, more preferably at most 10 mm, even more preferably at most 5 mm along the axial direction AD. The vane surfaces 25 typically has an extension of 4-5 mm along the axial direction AD.

It is contemplated that there are numerous modifications of the embodiments described herein, which are still within the scope of the invention as defined by the appended claims.

It may explicitly be noted that the valve disc gasket 10 may be provided with a) asymmetrical through-going openings 21 providing vane surfaces 25, and/or b) asymmetrical through-going slits 22 providing vane surfaces 25, and/or c) asymmetrical protrusions 23 providing vane surfaces 25, in any combination including only one, two, three or all four of these features in any permutation conceivable.

It may also be noted that in case the valve disc gasket 10 is provided with asymmetrical protrusions 23 having vane surfaces in combination with the valve disc gasket 10 also having through-going asymmetrical openings 21 and/or through-going asymmetrical slits 22, the vane surfaces 25 of the protrusions 23 may be circumferentially separated from the vane surfaces of the openings 21 and/or slits 22 as shown in the figures or may be formed such that the vane surface 25 of the protrusions 23 continues to form a vane surface 25 of the openings 21 and/or slits 22. It is also conceivable to have a valve disc gasket 10 with a combination of this, i.e. with vane surfaces 25 of some protrusions 23 circumferentially separated from the vane surfaces 25 of neighbouring openings 21 and/or slits 22 and vane surfaces 25 of some protrusions 23 being formed continuous with the vane surfaces of neighbouring openings 21 and/or slits 22.

The invention claimed is:

1. Valve disc gasket for use in a fluid flow control valve, the valve disc gasket comprising
    a frustoconical, ring-shaped body part having a geometrical main extension along a circular circumferential direction around an axis extending along an axial direction, wherein a cross-sectional shape of the frustoconical, ring-shaped body part, as seen in a radial plane, has the geometrical main extension being inclined relative to the axial direction with a main extension axial component along the axial direction and with a radial component along a radial direction, such that the frustoconical, ring-shaped body part extends along a geometrical frustoconical envelope surface tapering in the axial direction, wherein the frustoconical, ring-shaped body part has an outwardly facing front wall surface facing with a front wall surface axial component along the axial direction and an inwardly facing rear wall surface, opposite the front wall surface, the rear wall surface being configured to face a valve disc of said fluid flow control valve,
    wherein the valve disc gasket further comprises
    a plurality of asymmetrical through-going openings and/or slits extending from the front wall surface to the rear wall surface of the frustoconical, ring-shaped body part, the asymmetrical through-going openings and/or slits being distributed along the circular circumferential direction, wherein an internal surface of the respective asymmetrical through-going opening and/or slit forms a vane surface, and
    wherein the asymmetrical through-going openings and/or slits are asymmetrical such that a respective through-going opening or slit is asymmetric relative to any radial plane intersecting the respective through-going opening or slit.

2. Valve disc gasket according to claim 1, wherein each vane surface forms an angle with any radial plane intersecting the respective through-going opening or slit as seen in a plane having the axial direction as normal direction.

3. Valve disc gasket according to claim 1, wherein each vane surface has a major surface extension having a normal with a circumferential component along the circular circumferential direction.

4. Valve disc gasket according to claim 1, wherein each vane surface has a major surface extension defined by a vector having at least a vector axial component, along the axial direction and by a vector extending in a direction extending transversely to the axial direction and being inclined in a first direction relative to any radial plane intersecting the respective through-going opening or slit.

5. Valve disc gasket according to claim 1, wherein the valve disc gasket comprises the plurality of slits distributed along the circular circumferential direction, the slits extending from an inner circular surface of the frustoconical, ring-shaped body part, at least with a radial plane component along a respective radial plane, and through the frustoconical, ring-shaped body part from the front wall surface to the rear wall surface.

6. Valve disc gasket according to claim 5, wherein at least a sub-set of the plurality of slits are asymmetrical slits having an internal surface being provided with a respective one of said vane surfaces.

7. Valve disc gasket according to claim 1,
wherein the valve disc gasket comprises the plurality of slits distributed along the circular circumferential direction, the slits extending from an inner circular surface of the frustoconical, ring-shaped body part, at least with a slit radial plane component along a respective radial plane, and through the frustoconical, ring-shaped body part from the front wall surface to the rear wall surface,
wherein at least a sub-set of the plurality of slits are asymmetrical slits having an internal surface being provided with at least one of said vane surfaces, and
wherein the valve disc gasket comprises a plurality of asymmetrical protrusions distributed along the circular circumferential direction, wherein each protrusion extends from the front wall surface of the frustoconical, ring-shaped body part with a protrusion axial component along the axial direction and has an external surface forming at least one of said vane surfaces.

8. Valve disc gasket according to claim 1, wherein the valve disc gasket comprises the plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces.

9. Valve disc gasket according to claim 1,
wherein the valve disc gasket comprises the plurality of slits distributed along the circular circumferential direction, the slits extending from an inner circular surface of the frustoconical, ring-shaped body part, at least with a slit radial plane component along a respective radial plane, and through the frustoconical, ring-shaped body part from the front wall surface to the rear wall surface,
wherein at least a sub-set of the plurality of slits are asymmetrical slits having an internal surface being provided with at least one of said vane surfaces, and
wherein the valve disc gasket comprises the plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces.

10. Valve disc gasket according to claim 1, wherein the rear wall surface is shaped as a raceway allowing the valve disc gasket to rotate a plurality of revolutions on said valve disc of said fluid flow control valve.

11. Valve disc gasket according to claim 1, wherein each vane surface forms an angle with any radial plane intersecting the respective through-going opening or slit as seen in a plane having the axial direction as normal direction, the angle being at least 10 degrees relative to a central radial plane.

12. Fluid flow control valve comprising
a valve disc,
a valve disc gasket attached to the valve disc, and
a valve seat extending around a flow channel,
wherein the valve disc and the valve disc gasket are configured to be moved into abutment with the valve seat and thereby close the flow channel and to be moved a distance away from the valve seat and thereby open the flow channel,
the valve disc gasket comprising:
a frustoconical, ring-shaped body part having a geometrical main extension along a circular circumferential direction around an axis extending along an axial direction, wherein a cross-sectional shape of the frustoconical, ring-shaped body part, as seen in a radial plane, has a geometrical main extension being inclined relative to the axial direction with a main extension axial component along the axial direction and with a radial component along a radial direction, such that the frustoconical, ring-shaped body part extends along a geometrical frustoconical envelope surface tapering in the axial direction, wherein the frustoconical, ring-shaped body part has an outwardly facing front wall surface facing with a front wall surface axial component along the axial direction and an inwardly facing rear wall surface, opposite the front wall surface, the rear wall surface facing the valve disc of said fluid flow control valve, the valve disc gasket being configured to abut and seal against the valve seat during operation of the fluid flow control valve to close the flow channel,
a) a plurality of asymmetrical through-going openings and/or slits extending from the front wall surface to the rear wall surface of the frustoconical, ring-shaped body part, the asymmetrical through-going openings and/or slits being distributed along the circular circumferential direction, wherein an internal surface of the respective asymmetrical through-going opening and/or slit forms a vane surface, and/or
b) a plurality of asymmetrical protrusions having an extension from the front wall surface of the frustoconical, ring-shaped body part with a protrusion axial component along the axial direction, the asymmetrical protrusions being distributed along the circular circumferential direction, wherein an external surface of the respective protrusion forms a vane surface,
wherein the asymmetrical through-going openings and/or slits and/or asymmetrical protrusions are asymmetrical such that a respective through-going opening or slit and/or protrusion is asymmetric relative to any radial plane intersecting the respective through-going opening or slit and/or the respective protrusion, and
wherein the valve disc gasket fits loosely on the valve disc when the valve disc and valve disc gasket have been moved a distance away from the valve seat so that a flow of cleaning liquid directed at the vane surfaces will interact with the vane surfaces and apply torque to the valve disc gasket causing the valve disc gasket to rotate relative to the valve disc and thereby permit the fluid flow control valve to be cleaned in place by flushing the cleaning fluid through clearances between the valve disc and the valve disc gasket.

13. Method of cleaning a fluid flow control valve that comprises a valve disc, a valve disc gasket attached to the valve disc, and a valve seat extending around a flow channel, with the valve disc and the valve disc gasket being configured to be moved into abutment with the valve seat and thereby close the flow channel and to be moved a distance away from the valve seat and thereby open the flow channel, the valve disc gasket comprising:
- a frustoconical, ring-shaped body part having a geometrical main extension along a circular circumferential direction around an axis extending along an axial direction, wherein a cross-sectional shape of the frustoconical, ring-shaped body part, as seen in a radial plane, has a geometrical main extension being inclined relative to the axial direction with a main extension axial component along the axial direction and with a radial component along a radial direction, such that the frustoconical, ring-shaped body part extends along a geometrical frustoconical envelope surface tapering in the axial direction, wherein the frustoconical, ring-shaped body part has an outwardly facing front wall surface facing with a front wall surface axial component along the axial direction and an inwardly facing rear wall surface, opposite the front wall surface, the rear wall surface facing the valve disc of said fluid flow control valve;
- a) a plurality of asymmetrical through-going openings and/or slits extending from the front wall surface to the rear wall surface of the frustoconical, ring-shaped body part, the asymmetrical through-going openings and/or slits being distributed along the circular circumferential direction, wherein an internal surface of the respective asymmetrical through-going opening and/or slit forms a vane surface, and/or
- b) a plurality of asymmetrical protrusions having an extension from the front wall surface of the frustoconical, ring-shaped body part with a protrusion axial component along the axial direction, the asymmetrical protrusions being distributed along the circular circumferential direction, wherein an external surface of the respective protrusion forms a vane surface;
- the asymmetrical through-going openings and/or slits and/or asymmetrical protrusions being asymmetrical such that a respective through-going opening or slit and/or protrusion is asymmetric relative to any radial plane intersecting the respective through-going opening or slit and/or the respective protrusion, the method comprising:
- introducing a cleaning liquid in the flow channel such that a flow of cleaning liquid may be maintained during a cleaning period,
- moving the valve disc and the valve disc gasket attached thereto in close proximity to the valve seat, whereby a flow of cleaning liquid will interact with the vane surfaces such that the valve disc gasket is subjected to a torque around the axis thereby causing the valve disc gasket to rotate several revolutions about the axis relative to the valve disc.

14. Valve disc gasket for use in a fluid flow control valve, the valve disc gasket comprising:
- a frustoconical body part that is a ring-shaped body part, the ring-shaped body part being attachable to a valve disc of the fluid flow control valve and being movable into contact with a valve seat through movement of the valve disc to close the fluid flow control valve and movable away from the valve seat through movement of the valve disc to open the fluid flow control valve, the ring-shaped body having a geometrical main extension along a circular circumferential direction around an axis extending along an axial direction, wherein a cross-sectional shape of the ring-shaped body part, as seen in a radial plane, has the geometrical main extension being inclined relative to the axial direction with a main extension axial component along the axial direction and with a radial component along a radial direction, such that the ring-shaped body part extends along a geometrical frustoconical envelope surface tapering in the axial direction, wherein the ring-shaped body part has an outwardly facing front wall surface facing with a front wall surface axial component along the axial direction and an inwardly facing rear wall surface, opposite the front wall surface, the rear wall surface being configured to face a valve disc of said fluid flow control valve, the valve disc gasket being configured to abut and seal against the valve seat during operation of the fluid flow control valve to close the flow channel;
- a plurality of asymmetrical protrusions that protrude away from the front wall surface of the ring-shaped body part with a component along the axial direction, the asymmetrical protrusions being distributed along the circular circumferential direction, an external surface of the respective protrusion forms a vane surface;
- the valve disc gasket being configured to be loosely attachable on the valve disc so that when the valve disc and valve disc gasket have been moved a distance away from the valve seat, a flow of cleaning liquid directed at the vane surfaces will interact with the vane surfaces and thereby subject the valve disc gasket to torque around the axis causing the valve disc gasket to rotate relative to the valve disc; and
- the asymmetrical protrusions being asymmetrical such that a respective protrusion is asymmetric relative to any radial plane intersecting the respective protrusion.

15. Valve disc gasket according to claim 14, wherein each protrusion extends from the front wall surface of the frustoconical, ring-shaped body part with a protrusion axial component along the axial direction and has an external surface forming at least one of said vane surfaces.

16. Valve disc gasket according to claim 14,
- wherein each protrusion extends from the front wall surface of the frustoconical, ring-shaped body part with a protrusion axial component along the axial direction and has an external surface forming at least one of said vane surfaces, and
- wherein the valve disc gasket comprises a plurality of asymmetrical through-going openings distributed along the circular circumferential direction, wherein each asymmetrical through-going opening extends from the front wall surface to the rear wall surface of the frustoconical, ring-shaped body part and has an internal surface forming at least one of said vane surfaces.

17. Valve disc gasket according to claim 14, further comprising a plurality of slits spaced apart from one another along the circular circumferential direction, each of the slits opening to an inner circular surface of the ring-shaped body part and extending away from the inner circular surface of the ring-shaped body part, each of the slits passing through the ring-shaped body part from the front wall surface to the rear wall surface.

18. Valve disc gasket according to claim 17, wherein each of the slits is a radially oriented slit and is not an asymmetrical slit.

19. Valve disc gasket according to claim 14, wherein each vane surface forms an angle with any radial plane intersecting the respective protrusion as seen in a plane having the axial direction as normal direction.

20. Valve disc gasket according to claim 14, wherein each vane surface has a major surface extension having a normal with a circumferential component along the circular circumferential direction.

21. Valve disc gasket according to claim 14, wherein each vane surface has a major surface extension defined by a vector having at least a vector axial component, along the axial direction and by a vector extending in a direction extending transversely to the axial direction and being inclined in a first direction relative to any radial plane intersecting the respective protrusion.

22. Valve disc gasket according to claim 14, wherein the rear wall surface is shaped as a raceway allowing the valve disc gasket to rotate a plurality of revolutions on said valve disc of said fluid flow control valve.

23. Valve disc gasket according to claim 14, wherein each vane surface forms an angle with any radial plane intersecting the respective protrusion as seen in a plane having the axial direction as normal direction, the angle being at least 10 degrees relative to a central radial plane.

* * * * *